Aug. 2, 1938.  E. C. BRISBANE  2,125,330
MEANS FOR BREAKING VACUUM IN PIPE LINES
Filed Oct. 29, 1937  2 Sheets-Sheet 2
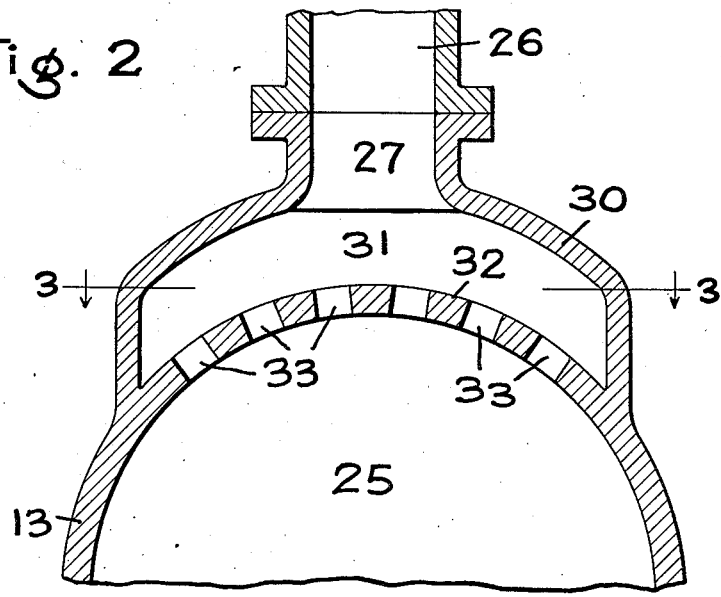
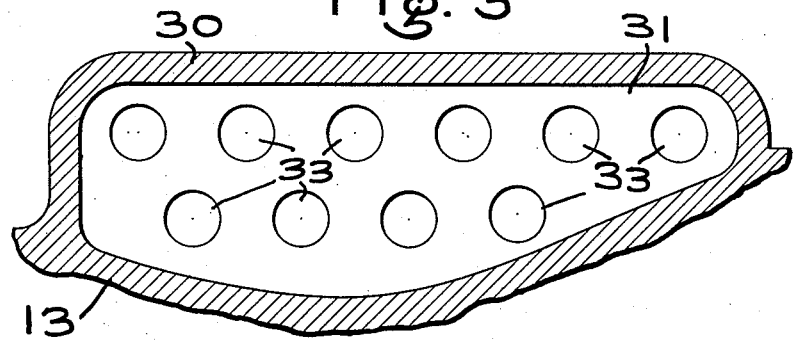
Inventor
EUGENE C. BRISBANE Patented Aug. 2, 1938

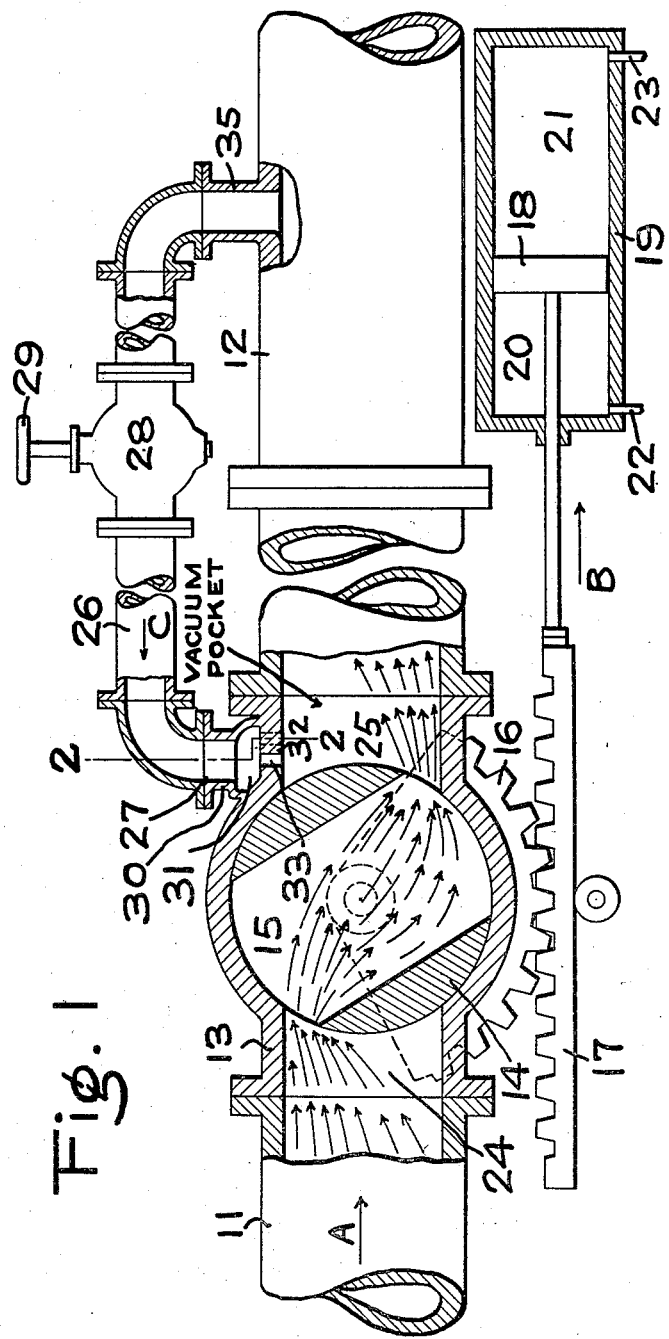

2,125,330

UNITED STATES PATENT OFFICE 2,125,330

MEANS FOR BREAKING VACUUM IN PIPE LINES

Eugene Charles Brisbane, Denver, Colo., assignor to S. Morgan Smith Company, York, Pa., a corporation of Pennsylvania Application October 29, 1937, Serial No. 171,698

2 Claims. (Cl. 137—69)

This invention relates to means for breaking or destroying vacuum pockets in pipe lines.

In pipe lines or water mains having control valves installed therein, vacuum pockets are sometimes formed on the downstream side of the valves, as the result of the high velocities of fluid flowing through the valves, when the valves are partly open after being closed. The vacuum condition results in cavitation, which has proven detrimental to the installations.

An object of the invention is to provide an improved method for destroying a vacuum pocket in a pipe line by utilizing the static pressure of fluid in the pipe and introducing such fluid under pressure in the pipe at the point in which vacuum is of the greatest intensity.

With the foregoing and other objects and advantages in view, the invention consists in the preferred construction and arrangement of the several parts which will be hereinafter fully described and claimed.

In the accompanying drawings:

Figure 1 is a diagrammatic view, partly in section, of a fluid control system embodying the present invention;

Fig. 2 is a section taken on the line 2—2 of Fig. 1; and

Fig. 3 is a section taken on the line 3—3 of Fig. 2.

Referring to the drawings, the main pipe line consists of two sections 11 and 12 connected to opposite sides of a valve 13.

Pipe 11 may lead from a suitable source of supply and the fluid in said pipe is normally maintained at a predetermined pressure by means of a suitable pump (not shown).

Pipe 12 is located on the downstream side of the valve 13, the direction of flow through the pipe line being indicated by the arrow A, Fig. 1.

The main valve 13 has a rotatable plug 14 with a waterway 15 formed therein. The plug 14 is adapted to be rotated by any suitable mechanism so as to control communication from pipe 11 to pipe 12.

In the present instance the plug operating mechanism is shown as comprising a sector 16 which is fixed to one end of the stem of the valve plug 14 and has teeth in meshing relationship with the teeth of a rack bar 17 adapted to be actuated by a piston 18 mounted in a cylinder 19. Chambers 20 and 21 on the opposite sides of piston 18 are adapted to be alternately supplied with fluid under pressure through pipes 22 and 23, respectively, from a suitable control mechanism (not shown).

When the rack bar 17 is moved in the direction of the arrow B, Fig. 1, by piston 18, the valve plug 14 will be moved from closed position towards open position. In the latter position, the waterway 15 registers with the waterways 24 and 25 in the valve 13 on opposite sides of the plug 14, said waterways 24 and 25 being connected to the ends of pipes 11 and 12, respectively, whereby free and unrestricted communication is established through the valve 13 from pipe 11 to pipe 12.

In Fig. 1 the valve plug 14 is shown in partly opened position. When the valve is closed, the pressure of the fluid in pipe 12 will be lower than the pressure of the fluid in pipe 11. Consequently when the plug 14 is being turned towards its open position, there will be an onrush of fluid from pipe 11 through the valve 13 to the pipe 12. With the valve plug waterway 15 positioned partly open, as shown in Fig. 1, the fluid from pipe 11 entering the waterway 25 on the downstream side of the valve 13 creates a vacuum in the upper portion of the pipe 12 and waterway 25, as indicated in Fig. 1. The presence of this vacuum is due to the fact that insufficient fluid flows through the waterway 15 into waterway 25, while the valve plug 14 is being turned to open position, to promptly fill the waterway 25 and the pipe 12.

Therefore, in order to destroy the vacuum, it has been found desirable to introduce an additional amount of fluid under pressure into the pipe line at the point in which the vacuum is located.

According to the present invention the additional supply of fluid is obtained from the pipe 12.

At a point adjacent to the valve 13, a pipe 26 is connected to the pipe line, as indicated at 27, Fig. 1. The other end of pipe 26 is connected to the pipe 12 at a point a suitable distance from the valve 13, as indicated at 35.

The static pressure of the fluid in the pipe line on the downstream side of the valve 13, that is to say, the pressure of the fluid in pipe 12 beyond the point in the pipe line in which the vacuum pocket is formed, is considerable.

Therefore, due to the difference in the fluid pressure at opposite ends of the pipe 26, there is a tendency for fluid to flow through the pipe 26 in the opposite direction to the direction in which the fluid flows through the main pipe line when the valve 13 is open (see arrow C, Fig. 1). Consequently when fluid under pressure is introduced into the vacuum pocket the pressure will be increased, with the result that the vacuum is destroyed.

Communication through pipe 26 may be controlled by a suitable valve 28 of any type. In the present instance valve 28 is shown as being manually operated, said valve having a hand wheel 29 secured to its plug shaft. It is to be understood that when so desired, any other type of valve device may be employed, such for instance, as an automatically operated valve.

In actual practice it has been found desirable to discharge the fluid from pipe 26 into the portion of the main pipe line having the vacuum pocket, in the form of a fan or spray. Therefore, a portion of the casing of the valve 13 surrounding the waterway 25 is formed with a manifold 30 (Fig. 2).

The manifold 30 forms an arcuate cavity 31 of somewhat larger area than the area of the connection of pipe 26 with the valve body 13, said cavity extending partly around the waterway 25 and being separated from the waterway 25 by a wall 32 having a plurality of openings 33 formed therein.

The upper portion of the manifold 30 is formed with an upwardly extending tubular portion constituting the means 27 to which one end of the pipe 26 is connected to the valve body.

The perforated wall 32 constitutes means for distributing the fluid over a considerable area within the downstream portion of the valve 13. This is for the purpose of breaking up the vacuum in the waterway 25 at more than one point.

When the valve plug 14 is turned from closed towards open position, valve 28 is also opened to permit fluid to flow through pipe 26 into the waterway 25 in a sufficient quantity to break up the vacuum. When the valve 28 is opened, fluid in the desired quantity flows into the waterway 25 and mixes with the fluid passing through the partly opened waterway 15 of the main valve 13, thereby destroying the vacuum in the pipe line at the point in the pipe line in which the vacuum is of the greatest intensity. When the vacuum is destroyed and the pressure increased in the portion of the pipe line indicated as the "vacuum pocket," Fig. 1, flow of fluid through the pipe 26 in the direction of the arrow C will cease, since there will not be sufficient differential in the pressures of the fluid at both ends of the pipe 26 to induce flow of fluid through the pipe 26 in the above described manner.

This system is adapted to be used for the purpose of breaking up vacuum in pipe lines having pressure reducing valves, throttling valves, or shut-off valves, where the introduction of air or other compressible fluids is not desired.

Having thus described my invention, what I claim is:

1. In a device of the class described, a conduit having a valve with a movable valve element for controlling communication through the conduit, a pipe connected at both ends to the conduit, both connections of the pipe with the conduit being on one side of said movable valve element, said pipe having a length sufficient to permit fluid to flow therethrough in a reverse direction to the direction in which the fluid flows through the conduit when the movable valve element is open, the flow of fluid through the pipe being induced by differential in pressures of fluid in the conduit at the points where the spaced ends of the pipe are connected to the conduit.

2. In a device of the class described, a main pipe line having a valve with a movable plug for controlling communication through the pipe line, a second pipe connected at both ends to the main pipe line, both connections of the second pipe with the main pipe being on one side of said valve, said second pipe having a length sufficient to permit fluid to flow therethrough in a reverse direction to the direction in which the fluid flows through the main pipe line when the valve plug is open, the flow of fluid through the second pipe being induced by differential in pressures of fluid in the main pipe line at the points where the spaced ends of the second pipe are connected to the main pipe; and means for controlling the flow of fluid through said second pipe.

EUGENE CHARLES BRISBANE.